(12) United States Patent
Eyal

(10) Patent No.: US 7,180,424 B2
(45) Date of Patent: Feb. 20, 2007

(54) CANINE SECURITY SYSTEM

(75) Inventor: Zehavi Eyal, Moshav Yarkona (IL)

(73) Assignee: Bio-Sense, Petach Tikva (IL)

( * ) Notice: Subject to any disclaimer, the term of this patent is extended or adjusted under 35 U.S.C. 154(b) by 0 days.

(21) Appl. No.: 10/528,072

(22) PCT Filed: Nov. 5, 2003

(86) PCT No.: PCT/IL03/00918

§ 371 (c)(1),
(2), (4) Date: Mar. 17, 2005

(87) PCT Pub. No.: WO2004/042670

PCT Pub. Date: May 21, 2004

(65) Prior Publication Data

US 2006/0170561 A1 Aug. 3, 2006

Related U.S. Application Data

(60) Provisional application No. 60/424,725, filed on Nov. 8, 2002.

(51) Int. Cl.
*G08B 23/00* (2006.01)

(52) U.S. Cl. .............................. 340/573.1; 340/573.2; 340/870.16; 340/539.11; 119/51.02; 119/174; 600/300; 600/303

(58) Field of Classification Search ............ 340/573.1, 340/573.2, 870.16, 539.11; 119/174, 51.02; 600/300, 303

See application file for complete search history.

(56) References Cited

U.S. PATENT DOCUMENTS

| | | | | | |
|---|---|---|---|---|---|
| 5,818,354 | A | * | 10/1998 | Gentry | 340/870.16 |
| 6,058,889 | A | * | 5/2000 | Van Curen et al. | 119/721 |
| 6,535,131 | B1 | * | 3/2003 | Bar-Shalom et al. | 340/573.1 |
| 6,761,131 | B2 | * | 7/2004 | Suzuki | 119/174 |
| 2002/0026311 | A1 | * | 2/2002 | Okitsu | 704/201 |
| 2003/0130568 | A1 | * | 7/2003 | Vodyanoy et al. | 600/303 |

* cited by examiner

*Primary Examiner*—Tai Nguyen
(74) *Attorney, Agent, or Firm*—Vladimir Sherman

(57) ABSTRACT

A computerized security system which enhances the security provided by watchdogs on a given premises by analyzing the auditory and physiological indications given by the dogs to assess the level of security at any point in time. By attaching sensors to the dogs and placing microphones in their proximity the system continuously collects information about the dogs' auditory and physiological behavior, and according to predetermined parameters it assesses the watchdogs' physiological and emotional state. Having concluded that any of the dogs sense a threat or has been neutralized in any way the system may update the state of security on the users' security terminals. The system determines between three possible security states: no alert when no irregular activity is registered, medium alert if the dogs indicate a state of moderate alertness and high incase there are indications for a definite hostile presence.

28 Claims, 7 Drawing Sheets

CANINE SECURITY SYSTEM

This Application is the National Stage of International Application No. PCT/IL 03/00918 filed Nov. 6, 2003, which claims the benefit of U.S. Provisional Application No. 60/424,725 filed Nov. 8, 2002. Additionally, this application claims the benefit of Israeli Patent Application No. IL164086, filed Sep. 14, 2004.

BACKGROUND OF THE INVENTION

The present invention relates to the field of premises security systems, and more specifically, to a computerized security system which incorporates the ability to interpret canines' (dogs) behavior. The use of dogs in securing premises is well known in the art since dogs have the natural ability to detect and react to suspicious activities in their vicinity.

There are many advantages to using dogs for securing premises besides having excellent detection abilities; dogs constitute a physical and a psychological deterring factor merely by their presence, or even just by the knowledge of their existence. In addition to providing a visible presence that deters potential criminal activity, they can abort such activities and detain any persons involved. Dogs may also be trained for specific and even highly complex security missions and can therefore answer special security needs.

In spite of their many advantages, dog-based security systems also have their shortcomings. For a dog-based security system to be effective, security personnel need to be in reach of the dogs for constant check-up and within hearing distance. For this end some systems make use of close-circuit surveillance systems providing full visual and audio coverage of the secured areas, which makes them costly and complex systems.

An additional problem with dog-based security systems is that dogs tend to bark for different reasons, not always for the purpose of indicating threat. Dogs may bark due to the appearance of an animal, at other dogs or at a friendly caretaker. Frequent barking may, at first, cause many false alarms and, in time, may cause the guards to unintentionally decrease their level of alertness.

A third problem stems from the fact that the dogs are vulnerable to direct attacks by weapons or by use of toxins—they can be shot and killed, drugged or poisoned. For such scenarios is required a Dog-based security systems which rely upon direct and constant visual contact between the guards and the dogs.

There is therefore a need for security systems that integrate automatic means into dog-based security methods. Such systems can then be attentive to indications given by the dogs and analyze them into readings of level of alarm. These systems then also monitor the state of the dogs on watch, and can activate an alarm whenever an attempt to hurt the dogs is made.

New developed applications for interpreting dogs' behavior are designed for the purpose of improving the communication between pet-dogs and their owners. Such a device is disclosed in Japanese Patent No. JP3083915, which attempts to interpret a dog's barks and cries and translate it to predetermined expressions of emotions and needs. The device includes a voice pattern for each dog type. Based on comparing dog barking patterns to a database of barks, the device is supposed to "translate" the dog's vocal expressions into a range of terms.

This patent is particularly aimed for leisure purposes not requiring high reliability of identification and is thus unsuitable for security systems, which require accurate recognition of the dog's sensed level of alarm. Furthermore, there are some major and fundamental technological differences:

The sound analysis method utilized in this patent addresses the sound characteristics of a single bark only, which limits the analysis accuracy.

Each sound pattern is compared to patterns in a preprogrammed database.

The device has preferably to be adjusted to work with specific dog type.

The device relies solely on audio signals, without making use of physiological parameters.

There is therefore a need for a computerized dog-based security system that can translate vocal and physiological indications given by dogs, to the security alarm level.

SUMMARY

A security system and method for alerting of security situations based on watchdogs' behavior which operates according to collected and analyzed auditory and physiological data from the dogs. This system is comprised of sensors for sampling dog sounds in the watchdog's vicinity, of means for collecting physiological data attached to the dog's body or implanted in it, and of means for processing the collected data and for identifying an alert situation. The audio data is converted to digital form and amplified by analog to digital converter and amplifier. The system then differentiates between different signal sources and identifies single barks sounds in accordance with received measurements. The system is also comprised of a means for identifying characteristic sound signal patterns and determining alert level by comparing the sound patterns to predefined values. Physiological data which include heartbeat rate, rate of breathing, muscle tonus, blood pressure and skin conductivity is also compared to predefined data and the dogs' state is estimated. According to valuated data the system assesses the level of security sensed by the dogs and in case of an alarming situation the user is notified via a security terminal unit.

In order to analyze the pattern of barking the system first filters background noises, distinguishes between barks from different sources and normalizes the signals. The sampled barks are then analyzed according to the characteristics of each single bark, such as the bark's frequency and pitch, and according to their characteristics over time such as measuring the mean and variant of time intervals, bark rate variability, barking rate and the distribution variance of the barks. The analyzing means may be embedded in the sensor means in the dogs' vicinity or remote, and the system therein includes of transmitting facilities for enabling connectivity between its different components.

DETAILED DESCRIPTION OF THE PREFERRED EMBODIMENTS

The present invention is a computerized dog-based security system which receives auditory and/or physiological signals from a single or a group of dogs on guard, analyzes them and gives indications as to the alert level according to the dogs' emotional state at any given point in time. The invention is a new and efficient means for integrating the many benefits and advantages of dogs (dogs) into an automatic interpretive security system.

The system receives auditory and/or physiological signals from dogs, performs a unique digital signal processing analysis, and provides an indication as to one of several possible system alert levels and events. At the heart of the system is a series of proprietary audio and physiological data processing algorithms, which digitally sample the signals, filter, identify and analyze the data profile according to predetermined parameters. It can detect the vitality signs of any specific dog, determine whether it is alive and awake, and measure its level of alertness. Based on this analysis, the system can provide a highly accurate estimation of the dogs' state of alertness in a specific location.

Figure 1:
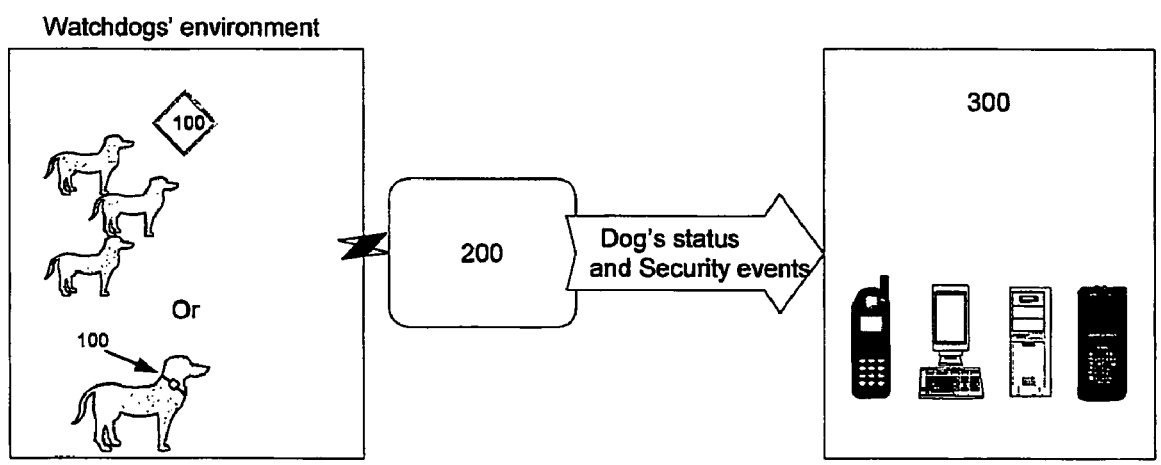
FIG. 1 is a schematic illustration of the system's flow of information.

The preferred embodiment of the present invention as illustrated in FIG. 1 includes three principal units: a monitoring unit 100, a processing and analyzing unit 200 and the user security terminal 300. The monitoring unit 100 is positioned in close proximity to the dogs or attached to the dogs, it records and transmits the raw data to the processing and analyzing unit 200, which performs the analysis and transmits the dog's alertness level to the user security terminal 300.

Figure 2:
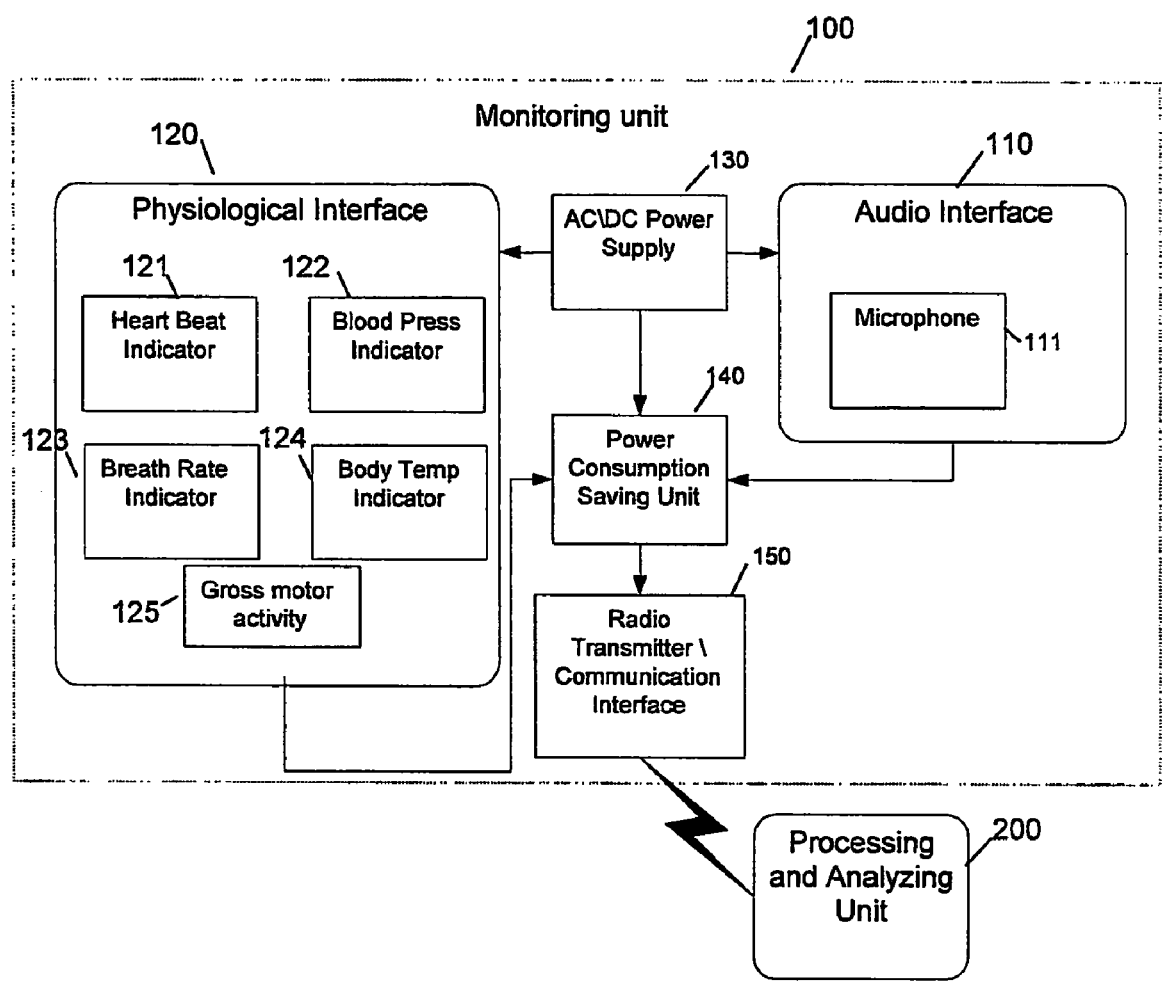
FIG. 2 is a block diagram of the Monitoring unit.

FIG. 2 illustrates the monitoring unit 100 that records and transmits vocal and physiological signals from the dogs. The audio signal-recording unit 110 is comprised of a sensor 111 for picking up the audio signal from the dogs. As illustrated in FIG. 1, the audio signal recording unit 110 may be attached or implanted to the dog or placed in its vicinity. The physiological sensor unit 120 records stress-related physiological indicators from the dogs' somatic system, such as heartbeat rate 121, blood pressure 122, breathing pace 123, body temperature 124 and gross motor activity 125. The physiological sensor unit 120 may be implanted into the dog or attached to its body. The monitoring unit 100 is also comprised of a AC\DC power supply unit 130, a power saving unit 140 (an electrical consumption reduction and saving unit), and a communication interface 150 which transmits the signals from the monitoring unit 100 to the processing and analyzing unit 200, using a radio transmitter or other physical communication methods; (Units 200 and 100 may be joined together to form one physical unit).

Figure 3:
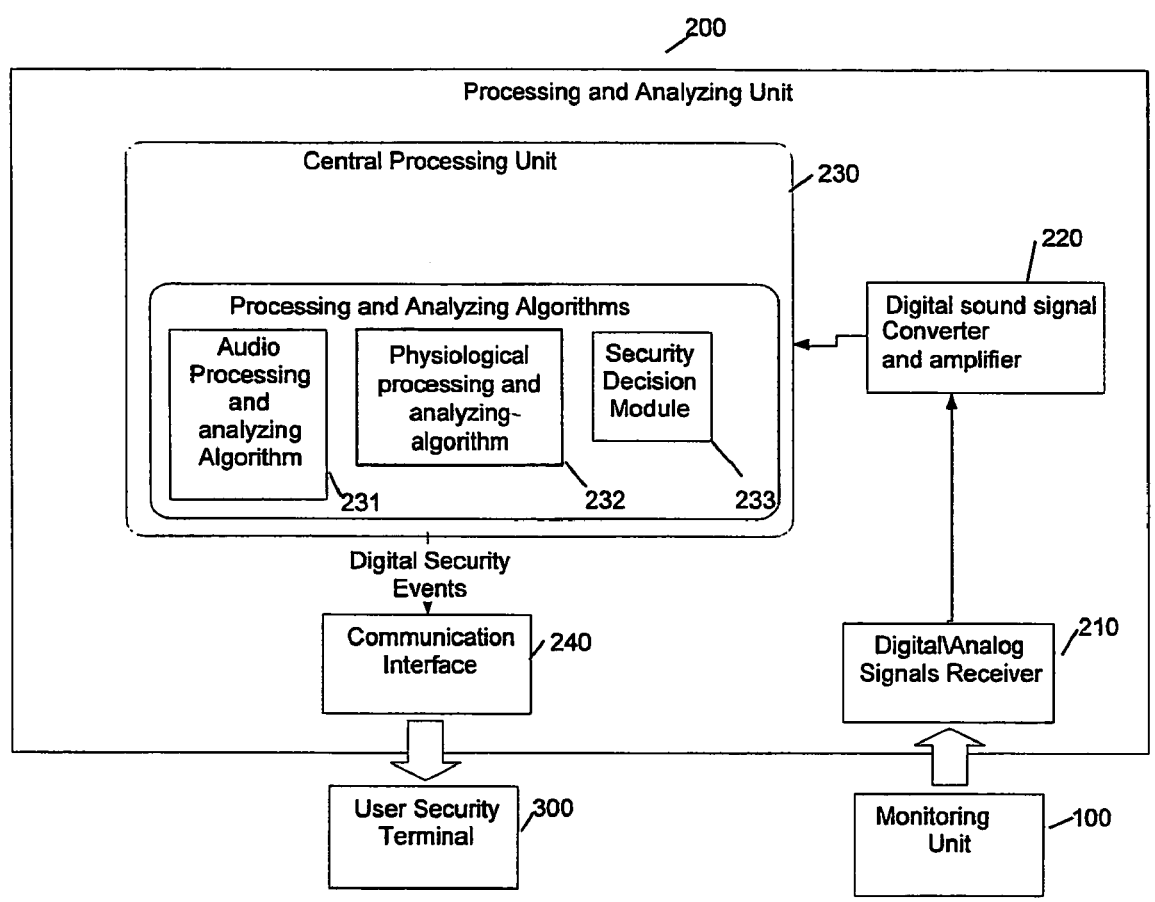
FIG. 3 is a block diagram of the processing and analyzing unit.

FIG. 3 illustrates the processing and analyzing unit 200. This unit 200 receives the data from the monitoring unit 100, processes and analyses it and transmits the output data to the user security terminal 300. The unit monitors the state of the dog and analyzes whenever the dog experiences an alarming situation. The processing and analyzing unit 200 may be embedded into monitoring unit 100, into the user security terminal 300 or a standalone remote unit.

The processing and analyzing unit 200 is comprised of a signal receiver 210, an analogue to digital (A/D) converter and amplifier 220, a central processing unit 230 and a communications interface 240. The signal receiver 210 receives the signals from each sensor unit 100 and transfers these signals to the A/D converter 220. The converter 220 amplifies the analog signals and transforms the analog signals to digital signals. A central processing unit 230 executes the main processing and analyzing algorithms. It includes an audio processing and analyzing algorithm 231, a physiological processing and analyzing algorithm 232 and a security decision module 233.

The audio processing and analyzing algorithm 231 receives the auditory signals and analyses them, hence providing a calculated estimation of the dog's psychological condition (indicating the dogs' alertness level). As illustrated in the flow charts in FIG. 4, the sound pattern processing algorithm module 231a processes the received signals, filters the environmental noise, and measures the energy level of several spectral bands of the audio signal and its cepstrum. The algorithm module 231b analyzes the processed signals and identifies emotional parameters. The analysis is based on predetermined audio parameters, incorporates bark detection, as well as on, an estimation of the bark's fundamental frequency (pitch) and temporal parameters including mean bark rate, time gap between barks, time variant of barks, and their intensity.

Figure 5:
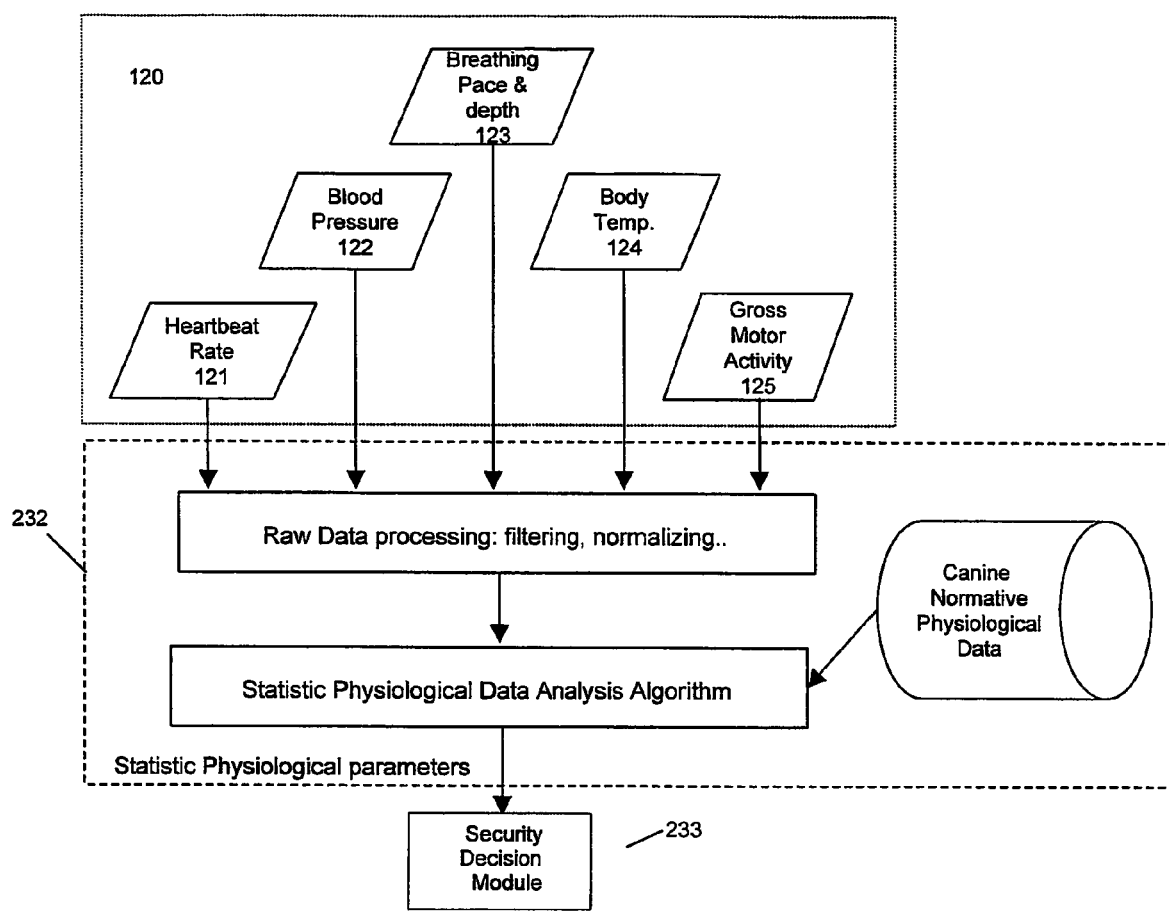
FIG. 5 is a flow chart of the physiological data monitoring and analyzing process.

The physiological analyzing algorithm 232 processes (see FIG. 5) the received physiological signals from the sensor 120 and estimates the dogs' emotional state based on the physiological data, according to predetermined physiological parameters (see FIG. 5). In the preferred embodiment, the physiological data includes the dogs' heartbeat rate 121, blood pressure 122, breathing pace 123, body temperature 124, and gross motor activity 125, but it may also include other physiological data such as, muscles tonus, skin conductivity and so on. Algorithm 232 analyzes these parameters for every sensor individually.

Figure 4:
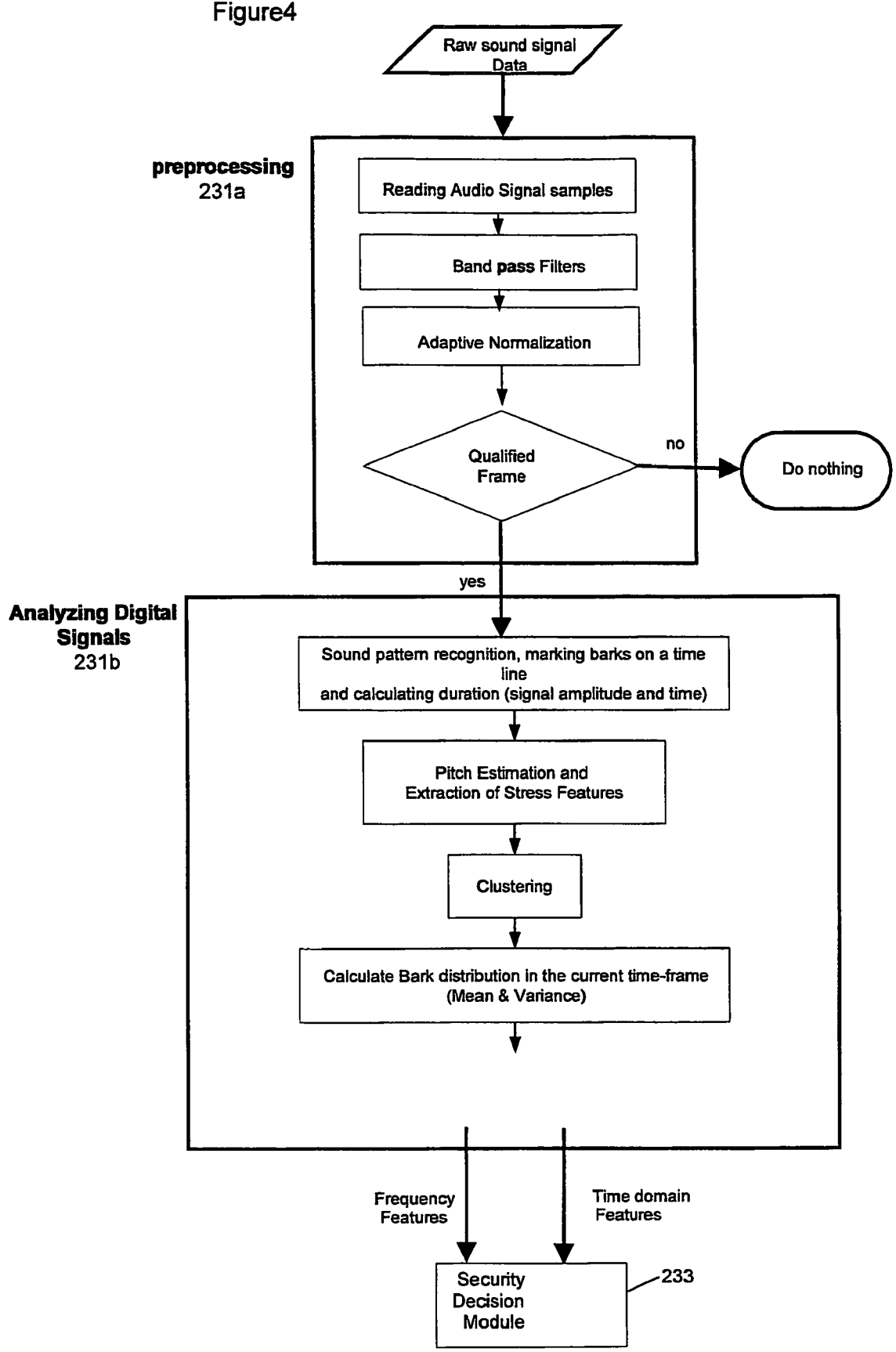
FIG. 4 is a flow chart of the system's sound pattern processing and analyzing algorithm.
Figure 6:
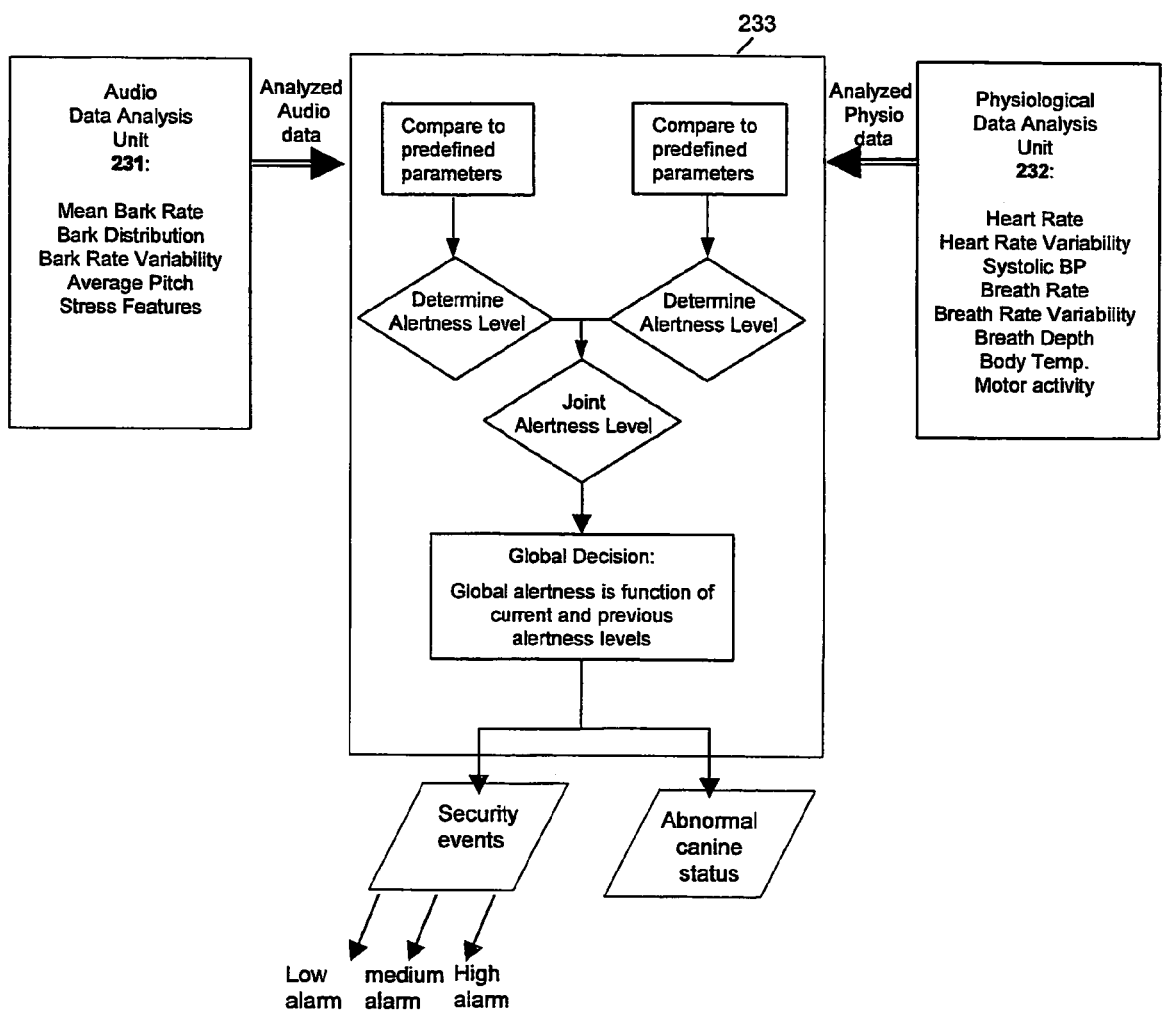
FIG. 6 is a flow chart of the decision module algorithm.

The security decision algorithm module 233 processes (see FIG. 6) the complete analyzed output data from algorithms 231 and 232 to determine the state of the dog. According to these readings, module 233 determines the current level of security and the nature of any security events. As previously mentioned, the processing and analyzing unit 200 also includes a communication interface 240 which is a communication unit component. This unit notifies the user security terminal 300 as to the:

occurrence of a security event,
the dogs' state (asleep, dead, functional, level of alertness, etc.)
system's functionality Block in FIG. 4 231a specifies the flowchart of pre-processing of audio data. The processing of the audio signal includes the following steps: first, the digital signal is passed through an array of digital band-pass filters (BPF) with varying frequency ranges and widths. This eliminates noise and measures the amount of signal energy at each frequency band. In order to maintain a standard and consistent framework along the time signal, the signal is then normalized to a given range (−1,1), in an adaptive manner.

Thereafter, the system determines if the current time frame is a qualified frame by checking whether in the current time frame the signal contains any valid sound patterns. The decision is based on the output of the BPFs' energy levels. This saves analyzing resources since it prevents the system from redundant operation if the signal contains only silence or background noise. If the frame is announced as having substantial data the process continues to the next stage.

Block 231b in FIG. 4 specifies the flowchart of analyzing the audio digital data. First a sound pattern is detected. The sound pattern detected relates mainly to bark sounds, but may also relate to other behavior characteristics such as breathing, sniffing or panting. The following description relates specifically to barking sounds, although the same analysis may be applied to other behavior patterns. The purpose of this analysis is to recognize barks when they occur and locate them on a time line. Looking for a specific energy pattern, which is typical to a dog's bark, achieves this purpose. The detected bark must also have a duration, which falls within predefined time limits, and have its amplitude above a certain level in order to be qualified as a bark. This step also helps the system to be more robust to various impulse and stationary noises. For each detected bark, the time-stamp of the bark peak, the bark's begin and end points, and the peak value are recorded into a vector. Each bark segment is further normalized by its peak energy value; so all barks are comparable in under equal conditions.

The next step estimates the pitch or the fundamental frequency of a bark. In addition, it looks for stress signs in the dog's bark.

Three major features of the sampled signal are analyzed on the basis of pitch measurement: distinguishing between barks originating in response to threat and barks, which are a response to routine activity (such as play, trainer, patrol or a stray cat, etc.); distinguishing between barks coming from different dogs and ruling out any sounds which are not barks, such as human speech or shouts. If a certain bark successfully meets all of the requirements of a valid bark, it is qualified and it remains in the bark vector. Otherwise, it is eliminated from the vector.

Next, spectral and cepstral analysis are performed for each qualified bark, and each bark is classified as one of three possible alert levels. The classification is performed by comparing the bark's spectral and cepstral features to a set of statistical models.

Then, clustering may be performed. The purpose of clustering is to classify the barks in the bark vector into groups that correspond to the possible sources of the audio signal. This classification is mainly done based on their pitch but it may also include other features. The source separation enables to distinguish between barks from different dogs. The clustering process further contributes to eliminating noise such as music, and human voices.

Finally, the clustered bark vector is analyzed statistically, calculating: the intervals between single barks, mean and variance of barking rate and barks distribution.

This statistical data, combined with the pitch, spectral, cepstral and stress features are delivered to the final decision module 233. The statistical decision module 233 receives features and parameters that characterize emotional and physiological behavior of the current time frame. The decision may result in determining that there is no alert, that the alert is at a medium level or that there is a high alert. Alert at a medium level might mean that there is some suspicious activity that needs attention, and high alert means that there is a definite territory intrusion, which may be an indication of a security breach.

At the same time the system can analyze every dog's physiological indicators, as received from the physiological sensor unit 120 as illustrated in FIG. 5. The physiological parameters are analyzed to determine the emotional state of the dog. The dog's state of alertness may be estimated by measuring different parameters of its somatic system. Being in a stressful situation causes an increase in the heartbeat rate, in the systolic blood pressure, in the body temperature and in the breathing rhythm and breathing depth. Monitored physiological parameters are categorized into three groups. Low rates on all indicators show that the dog is calm and that there is nothing attracting its attention in particular. A moderate increase in these parameters indicates that the dog is in a state of alertness due to an activity in its surroundings, which does not demand a special attention. High rates on these indicators show that the dog is in a state of stress and that an alarming situation has developed. In addition, measuring the dog's gross motor activity, taking into account its circadian activity rhythm and its general behavior patterns, can also help identifying irregular forms of reactions.

Integrating the information given by the analysis of the dog's auditory signals and its physiological status gives a highly accurate representation of the security status as it is sensed by the dog.

Monitoring the physiological status of the dog also ensures having a constant update on the well-being of the dog and his performance relating to security maters. Any attempt to hurt a dog, whether successful or unsuccessful, will be immediately apparent and would activate the alarms.

Figure 7:
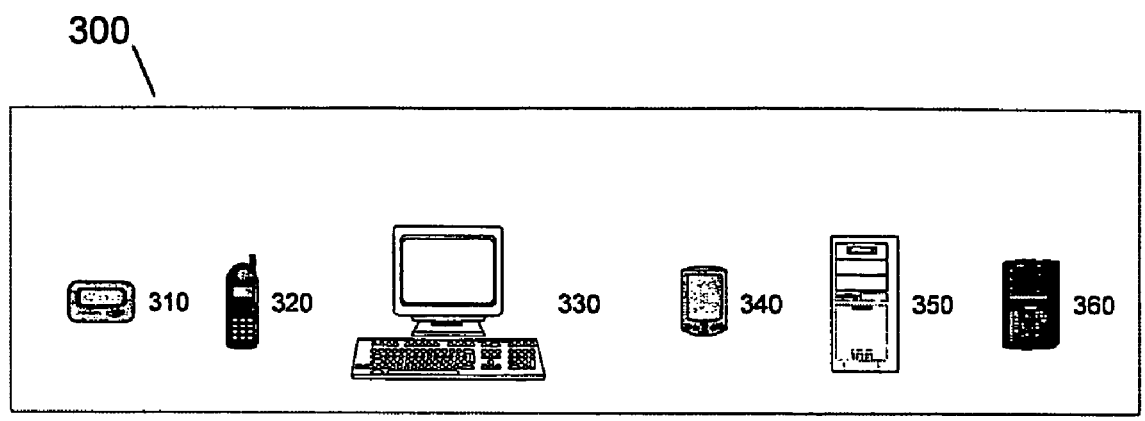
FIG. 7 represents a variety of possible embodiments of the user's security terminals.

The user security terminals 300 which are illustrated in FIG. 7 may include any set of integrated applications, including PC based security application 330, database and logging capabilities 350, user applications, security and alarm systems 360, an alarm transmission to Pagers 310, Mobile Phones or any other communication and notification devices 320. It may also integrate PDA's and mobile devices 340.

Additionally, the system can be easily adjusted to address specific needs, by training the dogs to react in a certain manner to specific situations and by translating the respective auditory and physiological indications of these reactions accordingly. By way of example, if, the dogs are trained to react intensively to an approaching vehicle as opposed to any person approaching by foot, they might still bark if a person appears, but their reaction will be a moderate one and it will be interpreted as such by the system, whereas an approaching car will cause the dogs to give a stressful reaction and activate the alarm.

While the above description is very specific, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

What is claimed is:

1. A security system for alerting of security situations, said system based on at least one dog behavior, said system comprised of:
   at least one audio sensor for sampling dog sounds;
   an analog to digital converter and amplifier;
   an audio processor for differentiating between different signal sources and identifying single barks sounds in accordance with received measurements;
   an audio analyzer unit for identifying characteristic sound signal patterns and determining alert level by comparing identified characteristics of sound patterns to predefined values, and wherein said analyzer is adapted to perform classification of a single bark by deriving spectral and cepstral features from the bark signal and performing a clustering algorithm based on statistical models;
   a security terminal unit for notifying user of alert situations.

2. The systems of claim 1 further comprising of at least one biological sensor for measuring dog physiological status.

3. The system of claim 2 wherein the physiological status includes heartbeat rate.

4. The system of claim 2 wherein the physiological status further includes breathing rate and depth, dog's gross motor activity, muscle tonus, skin conductivity and blood pressure.

5. The system of claim 1 wherein the sound signal characteristics are signal time domain parameters.

6. The system of claim 5 wherein the time domain parameters and statistics of calculated time intervals between single barks signals include: mean and variant of time intervals, bark rate variability, barking rate and the distribution variance of the barks.

7. The system of claim 1 wherein the sound signal characteristics are signal frequency domain parameters.

8. The system of claim 7 wherein the frequency domain parameters include pitch measurement for identifying single sound pattern, differentiating between signal sources or determining alert levels.

9. The system of claim 5 wherein the identification of a single sound pattern is achieved by detecting a signal energy pattern in the time domain.

10. The system of claim 1 wherein the audio processor includes band-pass filtering module for excluding background noises and signal normalization module.

11. The systems of claim 1 wherein the sound pattern relates to barks.

12. The systems of claim 1 wherein the sound pattern relates to sniffing, panting, or breathing.

13. The security system of claim 1 wherein the sensor unit, located at a distance from the processing, analyzing and control units, further includes one or more communication modules for transferring information between the units.

14. The security system of claim 1 wherein the sensor units are attached to the dog body.

15. The security system of claim 1 wherein the sensor units are located in the dog's vicinity.

16. The security system of claim 1 wherein the sensor units are implemented in the dog's body.

17. A security method for alerting of security situations, said method based on at least one dog behavior, said method comprising:
sampling dog sounds;
differentiating between different signal sources;
identifying single sound patterns in accordance to received samples;
identifying characteristics of sound pattern signals;
determining alert level by comparing identified characteristics of signal sound pattern to predefined values;
classifying a single bark by deriving spectral and cepstral features from the bark signal and performing a clustering algorithm based on statistical models;
notifying user of alert situation.

18. The method of claim 17 further comprising: measuring dog physiological status, processing physiological measurements and comparing to pre-defined values for determining alert situations.

19. The method of claim 18 wherein the physiological status includes heart beat rate.

20. The method of claim 18 wherein the physiological status further includes breathing rate, gross motor activity, muscles tonus, skin conductivity and blood pressure.

21. The method of claim 17 wherein determining alert levels includes analyzing time domain parameters.

22. The method of claim 21 wherein the time domain parameters include time intervals between single barks sound pattern, barking rate, the distribution variance of the barks and bark rate variability.

23. The method of claim 17 wherein determining alert levels includes analyzing frequency domain parameters.

24. The method of claim 23 wherein frequency domain parameters include pitch measurement for identifying single sound pattern, differentiating between signal sources or determining alert level.

25. The method of claim 23 wherein frequency domain parameters include signal amplitude pattern in the time domain.

26. The method of claim 17 further including: filtering background noises, amplifying signals, and normalizing signal amplitude.

27. The method of claim 17 wherein the sensor units are located at a distance from the processing, analyzing and control units further includes transferring information between the units.

28. A security system for alerting of security situations, said system based on at least one dog behavior, said system comprised of:
one or more audio processors adapted to differentiate between different signal sources and to identify single bark sounds in accordance with measurements received from one or more audio sensors associated with said security system;
an audio analyzer for identifying characteristic sound signal patterns and determining alert level by comparing identified characteristics of sound patterns to predefined values, and wherein said analyzer is adapted for classifying a single bark by deriving spectral and cepstral features from the bark signal and performing a clustering algorithm based on statistical models; and
one or more physiological data analyzers for identifying one or more characteristics of physiological data and for determining alert level by comparing identified characteristics of physiological data to predefined values.

* * * * *